United States Patent [19]

Sommer et al.

[11] Patent Number: 5,112,404
[45] Date of Patent: May 12, 1992

[54] PIGMENT FORMULATIONS, PROCESSES FOR THEIR PREPARATION AND THEIR USE

[75] Inventors: Andreas Sommer, Niedernhausen; Erwin Dietz, Kelkheim; Manfred Urban, Wiesbaden, all of Fed. Rep. of Germany

[73] Assignee: Hoechst Aktiengesellschaft, Frankfurt am Main, Fed. Rep. of Germany

[21] Appl. No.: 506,564

[22] Filed: Apr. 4, 1990

Related U.S. Application Data

[63] Continuation of Ser. No. 244,995, Sep. 15, 1988, abandoned.

[30] Foreign Application Priority Data

Sep. 19, 1987 [DE] Fed. Rep. of Germany ........ 3731637
Oct. 10, 1987 [DE] Fed. Rep. of Germany ........ 3836864

[51] Int. Cl.$^5$ .............................................. H01B 1/06
[52] U.S. Cl. ......................... 106/506; 106/494; 106/495; 106/497; 106/498; 106/411; 106/442; 106/505
[58] Field of Search ............... 106/506, 494, 495, 497, 106/498, 461, 505, 442; 544/194, 196, 198, 199, 215, 217

[56] References Cited

U.S. PATENT DOCUMENTS

| | | | |
|---|---|---|---|
| 4,491,481 | 1/1985 | Robertson | 106/506 |
| 4,634,552 | 1/1987 | Canestri | 106/506 |
| 4,666,526 | 5/1987 | Rolf et al. | 106/506 |
| 4,710,230 | 12/1987 | Okoshi et al. | 106/506 |

Primary Examiner—Josephine Barr

[57] ABSTRACT

The invention relates to readily dispersible pigment formulations which are stable to flocculation and are used for pigmenting naturally occurring and synthetic materials, preferably paints and printing inks, plastics and lacquers, in particular stoving lacquers. The pigment formulations contain compounds of the general formula (I)

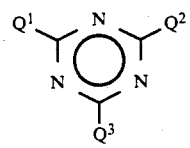

(I)

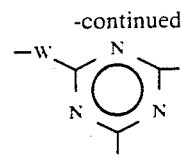

(Ia)

in which $Q^1$, $Q^2$ and $Q^3$ each denote —X—A, —OR$^1$, —SR$^1$, halogen, —NR$^2$R$^3$ or a radical Q which is built up from up to 15 trivalent groups (Ia) such that in each case one group (Ia) is bonded via W to a free valency of the next group (Ia) or to the triazine ring of (I) and the other free valencies are bonded to —X—A, —O—R$^1$, halogen or —NR$^2$R$^3$, at least one radical —X—A being present in (I), and A stands for an aromatic system with 2 to 6 rings and at least 9 ring atoms, or stands for a group of 2 to 3 aromatic ring systems, bonded via O, S, CO, SO, SO$_2$ or C$_1$-C$_{12}$-alkylene, of in each case 1 to 4 rings, A optionally also being substituted by C$_1$-C$_{24}$-alkyl, OR', halogen, NR'R", COOR', CONR'R", NR'COR", CN, CF$_3$ or NO$_2$, and R' and R" denote H or C$_1$-C$_{12}$-alkyl or, with N, a heterocyclic radical with 5 or 6 ring atoms, X stands for NR*, O or S, in which R* denotes H, C$_1$-C$_6$-alkyl, -hydroxyalkyl or -alkoxyalkyl or C$_5$-C$_7$-cycloalkyl, R$^1$, R$^2$ and R$^3$ each stand for H, alkyl, alkenyl, cycloalkyl, aralkyl, heteroalkyl, or phenyl, optionally substituted by C$_1$-C$_{12}$-alkyl, halogen, OR$^4$, NR$^4$R$^5$, COOR$^4$, CONR$^4$R$^5$, NR$^5$COR$^4$, CN, CF$_3$, NO$_2$ or —T(CH$_2$)$_p$NR$^o$R$^t$, in which R$^4$ and R$^5$ denote H or alkyl and R$^o$ and R$^t$ denote alkyl, p denotes 1-6 and T denotes a direct bond or O, S, CO, SO, SO$_2$, NR$^a$, NR$^a$CO, NR$^a$SO$_2$, SO$_2$NR$^a$ or CONR$^a$, and R$^a$ denotes H or C$_1$-C$_{12}$-alkyl, or stand for C$_1$-C$_{12}$-hydroxyalkyl or -polyhydroxylkyl or alkyl which is interrupted once or several times by O and/or NR$^v$, in which R$^v$ denotes H or alkyl, and can be substituted by a 5- or 6-membered heterocyclic ring, or R$^1$ has the above mentioned meaning and R$^2$ and R$^3$ together with N, stand for a 5- or 6-membered ring of a heterocyclic system with 1 or 2 rings, W is Y$^1$—Y—Y$^1$, in which Y denotes alkylene, optionally interrupted by O, S, NH, N(alkyl), CO, SO, SO$_2$, C$_5$-C$_7$-cycloalkylene, C$_5$-C$_{10}$-arylene or heteroarylene with 5–7 ring atoms or a 1–3-nuclear carbocyclic or heterocyclic ring system with 5 to 14 ring atoms or two of the ring systems, which are linked via a direct bond or O, S, CO, SO or SO$_2$, and Y$^1$ denotes O, S or NR$^5$, in which R$^5$ denotes alkyl, hydroxyalkyl, alkoxyalkyl or cycloalkyl or, together with N—Y—N, a heterocyclic ring.

The dispersing agents used can be prepared by reaction of cyanuric halides with corresponding compounds H—X—A, HOR$^1$, HSR$^1$, HNR$^2$R$^3$ and/or HWH.

12 Claims, No Drawings

PIGMENT FORMULATIONS, PROCESSES FOR THEIR PREPARATION AND THEIR USE

This is a continuation application of U.S. patent application Ser. No. 07/244,995, filed on Sep. 15, 1988 now abandoned.

DESCRIPTION

The invention relates to readily dispersible pigment formulations which are stable to flocculation and can be used for pigmenting naturally occurring and synthetic materials.

When pigments or pigment formulations are incorporated into paint systems, printing inks and plastics, difficulties associated with the fine division of the pigments often arise. Thus, numerous pigments can be dispersed in the particular use medium with satisfactory technological properties only with considerable mechanical effort. There is also a tendency of the fine pigment particles to agglomerate and flocculate out in the dispersions, which as a rule leads to an increase in the viscosity of the dispersion and in particular to losses of depth of color and gloss in the colored materials. As is known from DE-A-3,514,077 (U.S. Pat. No. 4,664,714), DE-A-3,106,906 (U.S. Pat. No. 4,310,359), DE-A-2,500,509 (U.S. Pat. No. 3,973,981) and JP-A-59,096,175, the dispersibility and flocculation stability of pigments can be improved by treating the pigments with pigment derivatives which have a chemical structure very similar to the particular structure of the pigment. However, the use of such pigment derivatives in pigment formulations has several disadvantages. Thus, the pigment derivatives must be matched in color shade to the particular pigment in the formulation and therefore cannot be used without reservation for formulations of other pigments. In addition, because the pigments on which the pigment derivatives are based are sparingly soluble, the derivatives can be prepared only under difficult conditions and with high costs. The pigment derivatives moreover as a rule do not have the same solvent-fastnesses as the pigments themselves. If the pigments modified with the derivatives are thus incorporated into a plastic or into a binder system, the deep-colored, more readily soluble pigment derivatives can migrate to the interface of the system and stain adjacent substances.

Dispersing agents for pigment formulations are already known from JP-A-59,193,125, the dispersing agents being obtainable by reaction of colorless aromatic compounds with hydroxymethylated or alkoxymethylated melamine, benzoguanamine or urea and subsequent reaction with phthalimide or hydroxymethylated phthalimide. Because the hydroxymethylated or alkoxymethylated starting substances are in each case to be used only as mixtures, the preparation of these dispersing agents has disadvantages and leads to poorly reproducible results.

The invention relates to pigment formulations which contain a) one or more pigments and b) one or more colorless or only slightly colored compounds of the general formula (I)

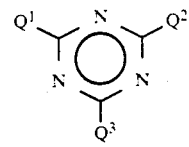

in which $Q^1$, $Q^2$ and $Q^3$ independently of one another each denote a —X—A, —$OR^1$, —$SR^1$, halogen or —$NR^2R^3$ radical or a radical Q of one, two or up to fifteen, preferably up to 6, trivalent groups of the formula (Ia)

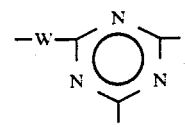

each of which is bonded via the divalent group W to a free valency of the next group of the formula (Ia) or to the triazine ring of the parent substance of the formula (I) and on the other free valencies in each case to a —X—A, —$OR^1$, —$SR^1$, halogen or —$NR^2R^3$ radical and which, in the case of more than two groups of the formula (Ia), are bonded to one another in linear or branched form, at least one radical of the formula —X—A being present in the compound of the formula (I) and A stands for the radical of an aromatic ring system with 2 to 6, preferably 2 or 3, fused-on rings and with a total of at least 9 and preferably up to 14 ring atoms, or stands for the radical of a group of 2 to 3, preferably two, bonded aromatic ring systems in each case of one ring or 2 to 4 fused-on rings, preferably 1 or 2 rings, with in each case 5 to 7 ring atoms per ring, in which the bonded aromatic ring systems are bonded via a direct bond or a divalent group from the series comprising —O—, —S—, —CO—, —SO—, —$SO_2$— and $C_1$–$C_{12}$-alkylene, preferably from the series comprising —O—, —CO—, —$SO_2$— and —$CH_2$—, or stands for one of the radicals mentioned, which contain one or more, preferably up to three, substituents from the series comprising $C_1$–$C_{24}$-alkyl, —OR', halogen, such as —F, —CL and —Br, —NR'R", —COOR', —CONR'R", —NR'COR", —CN, —$CF_3$ and —$NO_2$, preferably from the series comprising $C_1$–$C_4$-alkyl, —OR' and halogen, in which R' and R" independently of one another denote hydrogen or a straight-chain or branched $C_1$–$C_{12}$—alkyl, preferably hydrogen or $C_1$–$C_4$-alkyl, or together with the N atom denote a 5- or 6-membered heterocyclic radical, X stands for a divalent group —NR*—, —O— or —S—, preferably —NR*—, in which R* denotes a radical from the series comprising hydrogen, $C_1$–$C_6$-alkyl, $C_1$–$C_6$-hydroxyalkyl, ($C_1$–$C_4$-alkoxy)-$C_1$–$C_6$-alkyl and $C_5$–$C_7$-cycloalkyl, preferably hydrogen or $C_1$–$C_4$-alkyl, $R^1$, $R^2$ and $R^3$ independently of one another stand for the hydrogen radical, straight-chain or branched $C_1$–$C_{24}$-alkyl or $C_2$–$C_{24}$-alkenyl, preferably $C_1$–$C_{12}$-alkyl or $C_3$–$C_{12}$-alk-(2-11)-enyl, $C_5$–$C_{12}$-cycloalkyl with one or two rings, $C_7$–$C_{18}$-aralkyl, heteroaryl with 1 or 2 rings and a total of 5 to 8 ring atoms, phenyl, a phenyl radical which is substituted by at least one radical from the group comprising $C_1$–$C_{12}$-alkyl, halogen, such as F, Cl and Br, —$OR^4$, —$NR^4R^5$, —$COOR^4$, —$CONR^4R^5$, —NR⁵COR⁴, —CN, —CF₃, —NO₂ and —T—(CH₂)ₚ—NRᵒR', preferably from the group comprising C₁-C₆-alkyl, halogen, —NR⁴R⁵ and —T—(CH₂)ₚ—NRᵒR', in which R⁴ and R⁵ independently of one another denote hydrogen or C₁-C₂₄-alkyl, and preferably R⁴ denotes hydrogen or C₁-C₁₂-alkyl and R⁴ denotes hydrogen, Rᵒ and R' independently of one another denote C₁-C₂₄-alkyl, preferably C₁-C₁₂-alkyl. p denotes a number from 1 to 6 and T denotes a direct bond or a divalent group from the series comprising —O—, —S—, —CO—, —SO—, —SO₂—, —NRᵃ—, —NRᵃCO—, —NRᵃSO₂—, —SO₂NRᵃ— and —CONRᵃ—, preferably from the series comprising —SO₂—, —SO₂NRᵃ— and —CONRᵃ— and Rᵃ denotes hydrogen or a C₁-C₁₂-alkyl group, preferably hydrogen or C₁-C₄-alkyl, or stands for C₁-C₁₂-hydroxyalkyl or —polyhydroxyalkyl, or stands for a C₁-C₃₀-alkyl radical, which is interrupted in the chain by one or more non-adjacent divalent groups of the formula —O— or —NRʳ—, in which Rʳ denotes hydrogen or C₁-C₂₄-alkyl, preferably hydrogen or C₁-C₁₈-alkyl, or a combination of at least two of the divalent groups and which can be substituted by a 5- or 6-membered heterocyclic ring, and in particular thereby stand for a (C₁-C₄-alkoxy)-C₁-C₁₂-alkyl radical or a radical of the formula —(CR⁶R⁷)_q—NR⁸R⁹, in which q denotes a number from 1 to 6, R⁶ and R⁷ independently of one another denote hydrogen or C₁-C₆-alkyl, preferably hydrogen, and R⁸ and R⁹ independently of one another denote C₁-C₂₄-alkyl, preferably C₁-C₁₂-alkyl, or R⁸ denotes hydrogen and R⁹ denotes C₁-C₂₄-alkyl, preferably C₁-C₁₈-alkyl or R⁸ and R⁹, together with the n atoms, denote a 5- or 6-membered ring of a heterocyclic system, or R¹ has the abovementioned meaning and R² and R³, together with the n atom, stand for a 5- or 6-membered ring of a heterocyclic system with one or two rings, and W represents a divalent group of the formula —NRˢ—Y—NR'—, —O—Y—O—, —O—Y—NRˢ—, —S—Y—S—, —O—OY—S— or —NRˢ—Y—S—, preferably —NRˢ—Y—NR'—, wherein, in the above formulae, Y stands for a straight-chain or branched C₂-C₂₀-alkylene group, preferably a straight-chain or branched C₂-C₈-alkylene group, or a C₂-C₂₀-alkylene group, which is interrupted by one or more groups —O—, —S—, —NRᵘ—, in which Rᵘ denotes hydrogen or C₁-C₂₄-alkyl, preferably C₁-C₁₈-alkyl and in particular C₁-C₆-alkyl, —CO—, —SO—, —SO₂—, —C₅-C₇-cycloalkylene or C₅-C₁₀-arylene, a divalent heterocyclic ring with 5 to 7 ring atoms, preferably piperazine-1,4-diyl, or a combination of the above groups, and which is not further substituted or is further substituted, or stands for a divalent 1-, 2- or 3-nuclear saturated, unsaturated or aromatic carbocyclic or heterocyclic ring system with 5 to 14 ring atoms, preferably 1,4-phenylene, or two of the ring systems which are linked via a direct bond or a C₁-C₆-alkylene, —O—, —S—, —CO—, —SO— or —SO₂— group, the ring systems not being further substituted or being further substituted, and Rˢ and R' independently of one another denote a hydrogen radical, C₁-C₂₄-alkyl, preferably C₁-C₁₈-alkyl, in particular C₁-C₆-alkyl, C₁-C₆-hydroxyalkyl, (C₁-C₄-alkoxy)-C₁14 C₆-alkyl or cycloalkyl or, together with N-Y-N, denote a heterocyclic ring.

Pigment formulations according to the invention which are of particular interest are those which contain compounds of the formula (I) in which Q¹, Q² and Q³ independently of one another each denote a —X—A or —NR²R³ radical or a radical Q of 1 to 15 trivalent groups of the formula (Ia), each of which are bonded via the divalent group W to a free valency of the next group of the formula (Ia) or to the triazine radical of the parent substance of the formula (I) and on the other free valencies in each case to a radical —X—A or —NR²R³ and which, in the case of more than two groups of the formula (Ia), are bonded to one another in linear or branched form, at least one radical of the formula —X—A being present in the compound of the formula (I) and X, A, R², R³ and W having the meanings given.

Pigment formulations according to the invention which are of particular interest are also those with compounds of the formula (I) in which one or two of the radicals Q¹, Q² and Q³ in each case denote a radical of the formula —S—A and the other radicals Q¹, Q² and Q³ or the radicals on the other free valencies in the radical Q, which consists of the trivalent groups of the formula (Ia), are identical or different groups of the formulae —OR¹, —SR¹ or —NR²R³, in which R¹, R² and R³ have the meanings given.

Formulations according to the invention or organic pigments and compounds of the formula (I) in which A represents the radical of a fused heteroaromatic ring system, preferably a radical of a heteroaromatic ring system with 2 or 3 fused-on rings with a total of 9 to 14 ring atoms and with nitrogen or sulfur atoms or a mixture thereof as heteroatoms, it being possible for the ring system to contain the substituents mentioned, are of particular interest.

Formulations according to the invention which are preferred here are those with compounds of the formula (I) in which A represents a radical of carbazole, N-alkylcarbazole with 1 to 12 carbon atoms in the alkyl radical, benzothiazole, quinoline, quinaldine, benzimidazole or benzotriazole and X represents a divalent group of the formula —NR*—, in which R* is hydrogen or C₁-C₆-alkyl.

Formulations according to the invention which are of particular interest are also those which contain a compound of the formula (I) in which R¹, R² and R³ independently of one another stand for the hydrogen radical, straight-chain or branched C₁-C₁₂-alkyl or C₃—C₁₂-alk-(2-11)-enyl, C₅-C₇-cycloalkyl, C₇-C₁₂-phenylalkyl, heteroaryl with 5 or 6 ring atoms, phenyl, a phenyl radical which is substituted by 1 to 3 radicals from the group comprising C₁-C₁₂-alkyl, Cl, —OR⁴, —NR⁴R⁵ and —T—(CH₂)ₚ—NRᵒR', in which R⁴ and R⁵ independently of one another denote hydrogen or C₁-C₄-alkyl, and preferably R⁴ denotes hydrogen or C₁-C₄-alkyl and R⁵ denotes hydrogen, Rᵒ and R' independently of one another denote C₁-C₁₂-alkyl, p denotes a number from 1 to 6 and T denotes a direct bond or a divalent group from the series comprising —SO₂—, —SO₂NRᵃ— and —CONRᵃ—, or C₁-C₆-hydroxyalkyl, (C₁-C₄-alkoxy)-C₁-C₆-alkyl or a radical of the formula —(CH₂)_q—NR⁸R⁹, in which q denotes a number from 1 to 3, and R⁸ and R⁹ independently of one another denote C₁-C₆-alkyl or R⁸ denotes hydrogen and R⁹ denotes C₁-C₁₈-alkyl, or R⁸ and R⁹, with the N atom, denote a 5- or 6-membered ring of a heterocyclic system, or R¹ has the abovementioned meaning and R² and R³, together with the n atom, stand for a saturated, unsaturated or aromatic heterocyclic ring with 5 or 6 ring atoms and which is not further substituted or is further substituted.

Formulations according to the invention which are furthermore of particular interest are those with compounds of the formula (I) in which Y represents a substituted or unsubstituted $C_2$-$C_{20}$-alkylene group of a $C_2$-$C_{20}$-alkylene group which is interrupted by one or more divalent —O—, —S—, —NR$^u$—, in which R$^u$ denotes hydrogen or $C_1$-$C_{18}$-alkyl, —CO—, —SO—, —SO$_2$— or piperazine-1,4-diyl groups.

Pigment formulations which are likewise of particular interest are those which contain a compound of the formula (I) which W represents a group of the formula —NR$^s$—Y—NR$^t$—, in which Y stands for a straight-chain $C_2$-$C_8$-alkylene group or a $C_2$-$C_{12}$-alkylene group which is interrupted by one or more divalent —O—, —S—, —NR$^u$—, in which R$^u$ denotes hydrogen or $C_1$-$C_{18}$-alkyl, in particular $C_1$-$C_6$-alkyl, —CO—, —SO— or —SO$_2$— groups or a divalent heterocyclic radical with 5 to 7 ring atoms or a combination of the above groups, or stands for a divalent mono- or dinuclear carbocyclic or heterocyclic ring system with 5 to 8 ring atoms, or stands for two of the ring systems, which are linked by a direct bond or a —CH$_2$—, —CH(CH$_3$)—, —C(CH$_3$)$_2$—, —O—, —S—, —CO—, —SO— or —SO$_2$— group, the ring systems not being further substituted or being further substituted and R$^s$ and R$^t$ denote hydrogen or $C_1$-$C_{18}$-alkyl, in particular hydrogen or $C_1$-$C_6$-alkyl.

Formulations according to the invention which contain features of two or more formulations which are of particular interest are preferred.

The compounds of the formula (I) contained in the pigment formulations according to the invention can be prepared by reaction of cyanuric halides, in particular cyanuric chloride, with compounds with acid hydrogen of the formula H—X—A, H—O—R$^1$, H—S—R$^1$, H—NR$^2$R$^3$ or H—W—H or mixtures thereof, X, A, R$^1$, R$^2$, R$^3$ and W in the above formulae having the above-mentioned meanings and at least one compound of the formula H—X—A being used.

Compounds of the formula H—X—A are aromatic amino, alkylamino, hydroxy or mercapto compounds with more than one aromatic ring, the aromatic rings being fused-on or bonded to one another via divalent radicals, for example compounds based on naphthalene, anthracene, phenanthrene, pyrene, chrysene, fluorene, diphenyl, diphenyl ether, diphenyl sulfone, indole, quinoline, acridine, carbazole, dibenzofuran, dibenzothiophene, purine, benzimidazole, benzimidazolone, benzotriazole, benzothiazole or 2-phenylbenzothiazole, which carry one or more, preferably one, hydroxyl, mercapto, amino or alklyamino group on an aromatic nucleus and which can additionally carry the substituents mentioned above. The following compounds of the formula H—X—A, for example, are suitable for the preparation of the compounds of the formula (I) according to the invention:

aminocarbazoles, amino-N-9-alkyl-carbazoles, hydroxycarbazoles, aminobenzothiazoles, aminophenylbenzothiazoles, mercaptobenzothiazoles, naphthylamines, aminobenzotriazoles, aminofluorenes, aminopyrenes, 4-aminophenyl-benzophenones, hydroxybenzophenones, aminoquinolines, aminoquinaldines, aminobenzimidazoles, aminobenzimidazolones, mercaptobenzimidazoles, aminopurines, aminodiphenyl ethers, aminodiphenyl sulfones, naphthols, aminophthols, mercaptobenzoxazoles, mercaptopurines, hydroxydiphenyls, hydroxyquinolines, hydroxydiphenylmethanes, hydroxydiphenyl ethers, hydroxyquinaldines, 5-mercapto-1-phenyl-1,2,3,4-tetrazole and aminophenylbenzothiazoles, preferably aminocarbazoles, 2-hydroxycarbazole, amino-N-9-alkyl-carbazoles, 2-aminobenzothiazoles, 2-mercaptobenzothiazole, aminobenzotriazoles, 2-aminofluorene, 3-aminopyrene, 4-(4-aminophenyl)-benzophenone, aminoquinolines, aminoquinaldines, aminobenzimidazoles, 5-aminobenzimidazolone, 2-mercaptobenzimidazole, 6-aminopurine, 4-aminodiphenyl sulfone, 2-mercaptobenzoxazole, 6-mercaptopurine, 4-hydroxydiphenylmethane and 2-(aminophenyl)-benzothiazoles. Compounds which are particular suitable as the compounds H—X—A are: 3-aminocarbazole, 2-aminocarbazole, 3-amino-N-9-ethylcarbazole, 2-aminobenzothiazole, 2-amino-6-methoxybenzothiazole, 2-amino-6-ethoxybenzothiazole, 2-amino-5,6-dimethylbenzothiazole, 2-amino-4-methylbenzothiazole, 2-amino-6-chloro-benzothiazole, 2-amino-4-methoxybenzothiazole, 2-amino-6-nitrobenzothiazole, 2-amino-5-methoxybenzothiazole, 2-amino-6-methylbenzothiazole, 2-(4-aminophenyl)-6-methylbenzothiazole, 2-aminobenzimidazole, 4-aminoquinaldine and 8-aminoquinaldine.

The aromatic ring system A is as a rule structurally different from the ring system of the pigment molecule. Particularly good flocculation stabilities are often achieved if the aromatic ring system A is built up in the same way as or similarly to a part region of the ring system of the organic pigment molecule.

Examples of compounds of the formula H—O—R$^1$ are alkanols, such as methanol, ethanol, propanol, isopropanol, n-butanol, 2-butanol, isobutanol, 2-methylpropan-2-ol, pentanol, hexanol, heptanol, octanol, nonanol, decanol, undecanol, dodecanol, tetradecanol, hexadecanol and octadecanol, alkenols, such as hexenol and oleyl alcohol, cycloalkanols, such as cyclohexanol, cyclopentanol and cycloheptanol, arylalkanols, such as benzyl alcohol, phenylethanol and phenylpropanol, glycols and glycol monoalkyl ethers, such as ethanediol, propanediol, hexanediol, methoxyethanol, ethoxyethanol, methoxypropanol, ethoxypropanol, butoxyethanol, butoxypropanol and methoxybutanol, dialkylaminoalkanols, such as dimethylaminoethanol, diethylaminoethanol, dimethylaminopropanol and diethylaminopropanol, phenol and substituted phenols, for example alkylphenols, such as o—, m— and p-cresol, ethylphenols, nonylphenol and dodecylphenol, resorcinol, pyrocatechol, chlorophenol, dichlorophenol, methoxyphenol, ethoxyphenol, dimethylaminophenol, salicylic acid, methyl salicylate, hydroxybenzoic acid amide, halogenophenols, such as chlorophenol, dichlorophenol and bromophenol, nitrophenols, such as o—, m— and p-nitrophenol and 2,4-dinitrophenol, 3-hydroxybenzoic acid, 4-hydroxybenzoic acid and 2-hydroxybenzotrifluoride.

The alkanols mentioned with 1 to 6 carbon atoms, cyclohexanol, benzyl alcohol, phenylethanol, di-($C_1$-$C_4$-alkyl)amino-$C_1$-$C_4$-alkanols, phenol and substituted phenols are particularly suitable, Methanol, ethanol, propanol, isopropanol, butanol, isobutanol, dimethylaminoethanol, diethylaminoethanol, dimethylaminopropanol and diethylaminopropanol are particularly preferred.

Examples of compounds of the formula HSR$^1$ are thiols analogous to the abovementioned alcohols, in particular ethylmercaptan, hexylmercaptan, mercaptoethanol, cyclohexylmercaptan, benzylmercaptan, phenylethylmercaptan, mercaptoethyl-methyl ether, mercaptoethyl-ethyl ether, dimethylaminoethylmercaptan, diethylaminoethylmercaptan, dimethylaminopropylmercaptan, diethylaminopropylmercaptan, thiophenol and substituted thiophenols.

Examples of compounds of the formula H—NR$^2$R$^3$ are alkylamines, such as ethylamine, diethylamine, propylamine, butylamine, hexylamine, cyclohexylamine, octylamine, decylamine, dodecylamine, hexadecylamine, octadecylamine, octadecenylamine, coconut fatty amine, oleylamine, stearylamine and tallow fatty amine, alkoxyalkylamines, such as 3-methoxypropylamine and 3-ethoxypropylamine, arylalkylamines, such as benzylamine and phenylethylamine, alkanolamines, such as ethanolamine and diethanolamine, polyamines, such as fatty alkylalkylenediamines, for example laurylpropylenediamine and tallow fat propylenediamine, or fatty alkylenetriamines or -tetramines, for example N-(3-tallow fat-aminopropyl)-1,3-diaminopropane, N-[N-(3-tallow fat-aminopropyl)-3-aminopropyl]-1,3-diaminopropane and corresponding compounds with a lauryl, myristyl, cetyl, stearyl or oleyl radical instead of the tallow fat radical, dialkylaminoalkylamines, such as N,N-dimethylaminoethylamine, N,N-dimethylaminopropylamine, N,N-diethylaminopropylamine, N,N-dimethylaminobutylamine, N,N-dipropylaminobutylamine, N,N-dibutylaminobutylamine, N,N-diisobutylaminopentylamine, N,N-diethylaminopentylamine, N,N-diethylaminohexylamine, N,N-methyllaurylaminopropylamine, N,N-dioleylaminoethylamine and N,N-distearylaminobutylamine, heterocyclic compounds with aminoalkyl groups, such as N-aminomethylpiperidine, N-aminoethylpiperidine, N-aminopropylpiperidine, N-aminoethylpyrrolidine, N-aminopropylpyrrolidine, N-aminoethylpicoline, N-aminopropylpicoline, N-aminoethylmorpholine, N-aminopropylmorpholine, 1-(3-aminopropyl)-imidazole and 1-(2-aminoethyl)-piperazine, aromatic amines, such as aniline, N-alkylanilines, C-alkylanilines, alkylaminobenzenes, halogenoanilines, aminophenol, aminobenzoic acid esters, nitranilines, p-(dimethylamino)-aniline, p-dimethylaminomethylaniline and, preferably, 1-(4-aminophenyl)-3-diethylamino-1-propanone, 4-(2-diethylamino-ethylsulfonyl)-aniline, N-(4-aminophenyl)-N-methyl-3-diethylaminopropionamide, N-(4-aminophenyl)-N-methyl-3-diethylaminoethanesulfonamide, 4-amino-N-(3-diethylaminopropyl)benzenesulfonamide and 4-amino-N-(3-diethyl-aminopropyl)benzamide, heterocyclic amines, such as aminotriazoles, aminothiazoles, aminopyridines, aminopiperidines and aminopiperazines, and heterocyclic compounds with a reactive nitrogen atoms, such as substituted and unsubstituted imidazoles, benzimidazoles, triazoles, morpholines, pyrrolidines, piperidines, imidazolines, imidazolidines and piperazines.

Particularly suitable amines H—NR$^2$R$^3$ are the above alkylamines, alkoxyalkylamines, alkanolamines, dialkylaminoalkylamines and heterocyclic compounds with aminoalkyl groups, the above preferred aromatic amines, morpholines, pyrrolidines, piperidines, imidazolines, imidazolidines and piperazines, preferably the above dialkylaminoalkylamines, the heterocyclic compounds with aminoalkyl groups, the above preferred aromatic amines and imidazolines, imidazolidines and piperazines.

Some of the abovementioned alcohols, thiols and amines are difunctional and, depending on the amount used and the reaction conditions, can be used as compounds of the formula H—W—H, which are intended for building up the divalent groups W according to formula (Ia). Examples of preferred compounds of the formula H—W—H are alkylenediamines, such as ethylenediamine, propylenediamine, 1,4-butanediamine or hexamethylenediamine, N,N-bis-(aminoalkyl)-alkylamines, such as N,N-bis-(aminopropyl)-tallow fatty amine, -laurylamine, -myristylamine, -cetylamine or -stearylamine, N-methyl-diethylenetriamine, 4,4'-diaminodicyclohexyl-methane, 1,4-bis-(3-aminopropyl)-piperazine, 4,4'-diaminodiphenylmethane, 4,4'-diaminodiphenyl ether, 4,4'-diaminodiphenyl sulfone, phenylenediamines and substituted benzidines. Other possible compounds of the formula H—W—H are the corresponding hydroxy and thiol compounds, for example disphenol A, 4,4'-dihydroxydiphenyl ether, 4,4'-dihydroxydiphenyl sulfone, mercaptoethanol, mercaptobutanol, aminoethanol, aminopropanol, aminothiophenols, glycol, diethylene glycol, triethylene glycol and 1,4-dihydroxycyclohexane.

For preparation of the compounds of the formula (I), all the reaction partners can be reacted simultaneously. However, the less reactive H-acid compounds can first be reacted with the cyanuric halide and the more reactive components can be reacted in one or more further reaction steps. In some cases it may be necessary or advantageous additionally to use acid-binding agents, for example tertiary amines, in particular pyridine or triethylamine, alkali metal hydroxides or alkali metal carbonates.

The compounds of the formula (I) can be prepared by customary methods. As a rule, the reaction partners are reacted in protic or aprotic solvents, preferably in a largely inert organic solvent. Suitable solvents are, for example, aromatic hydrocarbons, such as toluene, xylene, trimethylbenzene, chlorobenzene and dichlorobenzene, ethers, such as, for example, ethylene glycol dimethyl ether, ethylene glycol diethyl ether, propylene glycol dimethyl ether, propylene glycol diethyl ether, diethylene glycol dimethyl ether and dioxane, esters, such as, for example, N-butyl acetate, methylglycol acetate and ethylglycol acetate, ketones, such as, for example, methyl ethyl ketone, methyl isobutyl ketone and cyclohexanone, amides, such as, for example, dimethylformamide, dimethylacetamide and N-methyl-2-pyrrolidone, and dimethyl sulfoxide and sulfolane.

The reaction to prepare the compounds of the formula (I) is carried out at a temperature of 0° to 180° C., preferably 20° to 140° C., depending on the reactivity of the reaction partners used and the nature of the solvent. If acid-binding agents are absent, the compounds of the formula (I), which contain basic nitrogen, may initially be obtained in the form of their salts, which can in many cases easily be isolated from the reaction solution on the basis of their poor solubility, for example by filtration. These salts are then preferably converted into the free bases in the presence of basic compounds, for example pyridine, triethylamine, alkali metal hydroxides or alkali metal carbonates. However, in many cases the compounds of the formula (I) can also be used in the context of the invention in the form of their salts with inorganic or organic acids.

Inorganic and organic pigments, in particular organic pigments, such as, for example, azo pigments, azaporphines quinacridones, diketopyrrolopyrroles, flavanthrone, anthanthrone and pyranthrone substances, derivatives of naphthalenetetracarboxylic acid, perylenetetracarboxylic acid, thioindigo, dioxazine or tetrachloroisoindolinone, lake pigments, such as the magnesium, calcium, barium, aluminum, manganese and nickel lakes of dyestuffs containing acid groups, and corresponding pigments mixtures are suitable for the pigment formulations according to the invention. The pigment formulations according to the invention preferably contain 99.8 to 50% by weight, in particular 97 to 70% by weight, of pigment.

Preferred pigment formulations according to the invention contain 0.2 to 30% by weight, preferably 1 to 20% by weight, of compounds of the formula (I) based on the pigment.

To achieve optimum rheological and coloristic properties, the pigments are preferably coated or mixed with 0.3 to 10 mg of the compounds of the formula (I) per square meter of pigment surface, in particular 0.6 to 5 mg of compound of the formula (I) per square meter of pigment surface.

The invention also relates to the process for the preparation of the pigment formulations claimed, which comprises coating the surface of the pigments with one or more compounds of the formula (I).

There are a number of possibilities for applying the compounds of the formula (I) to the pigment surface. This operation can thus be carried out during or after synthesis of the pigment, in a finished process or during further processing of the pigment in the use medium. Application of the compounds of the formula (I) during synthesis of the pigment or in combination with a finish process is particularly preferred. In the case of pigments which are in finely divided form after synthesis, the compounds of the formula (I) or their salts can be added before synthesis of the pigment, for example to the components of the pigment synthesis, or during synthesis of the pigment or after synthesis of the pigment, to improve the pigment properties. In the case of coarsely crystalline crude pigments which have to be finely divided after synthesis, the compounds are advantageously added only after synthesis and before fine division or after fine division of the coarsely crystalline crude pigment.

Depending on the procedure, the compounds of the formula (I) can be applied to the pigment particles, for example, in aqueous suspension, in water-solvent mixtures or in organic solvents. If dry pigment powders are used, the pigment formulations according to the invention can additionally be prepared by simple mixing with a pulverulent compound of the formula (I). Better results are as a rule achieved if the compound of the formula (I) is added to the dry pigment or, preferably, to the moist pigment and the mixture is subjected to a grinding process in the grinding units usually employed, for example in kneaders, bead mills or roll mills. The compounds of the formula (I) can also be added together with the pigment during incorporation into the use medium.

If the compounds of the formula (I) are applied to the pigments in aqueous suspension or in water-solvent mixtures, the pigment is then usually isolated by filtration. The pH during isolation of the pigment as a rule has an influence on the pigment properties. The optimum pH can vary from case to case and is advantageously determined in a few preliminary experiments.

The pigment formulations according to the invention can be in solid form or in liquid form in any desired dilution with aqueous and non-aqueous media, for example in suspension in organic solvents or water.

It may be advantageous to use the pigment formulations according to the invention in combination with surfactants. The pigment formulations can also contain the surfactants directly. Suitable surfactants are anionic, cationic and nonionic compounds, for example alkyl sulfates, alkylsulfonates, alkyl phosphates and alkyl benzenesulfonates, in particular lauryl sulfate, stearyl sulfate, dodecyl sulfate, dodecyl sulfonates, octadecyl phosphates and dodecylbenzenesulfonates, sulfosuccinic acid esters, condensation products of a fatty acid and taurine or hydroxyethanesulfonic acid, resin soaps, alkoxylation products of alkylphenols, fatty alcohols, fatty amines, fatty acids and fatty acid amides, in particular reaction products of nonylphenyl, dodecylphenol, lauryl alcohol, coconut fatty alcohol, stearyl alcohol, oleyl alcohol, coconut fatty amine, tallow fatty amine, stearylamine, oleylamine, coconut fatty acid, stearic acid or oleic acid with 2 to 100 mol, preferably 5 to 30 mol, of ethylene oxide, reaction products of oxyethylates alkylphenols and fatty alcohols with chlorosulfonic acid and phosphorus oxychlorides. Possible cationic surfactants are quaternary ammonium salts, for example hexadecyltrimethylammonium chloride. The surfactants mentioned can be used by themselves or as mixtures. The surfactants can in each case be added before, during or after the pigment finishing, and it is not necessary for the surfactant and the compounds of the formula (I) to be added in the same stage of pigment finishing.

Particularly preferred pigment formulations essentially consist of
a) at least one organic pigment
b) 0.2 to 30% by weight, in particular 3 to 15% by weight, of a compound of the formula (I),
c) 0 to 20% by weight, in particular 0 to 10% by weight, of an anionic, cationic or nonionic surfactant, and
d) 0 to 20% by weight, in particular 0 to 10% by weight, of customary additives, the amounts of the constituents b), c) and d) being based on the weight of the pigment or pigments.

The customary additives are, for example, residual salts from the pigment synthesis, inorganic fillers, such as finely divided barium sulfate, chalk, various types of silicic acid, aluminum oxides or carbon black, water and preservatives. The water content of the pigment formulations is preferably less than 1% by weight, in particular less than 0.2% by weight.

The invention also relates to the use of the pigment formulations according to the invention for pigmenting and coloring naturally occurring and synthetic materials. Use in the preparation of paints and printing inks and for coloring plastics and high-molecular-weight materials is preferred. The use for pigmenting lacquer systems, in particular stoving lacquer systems, ion particularly preferred.

In most lacquer systems, but above all in the systems which are usually difficult to pigment, such as TSA-NAD (thermosetting acrylic non-aqueous dispersion) and "high solids", the pigment formulations according to the invention exhibit excellent rheological properties, for example an outstanding gloss, good flow properties and good flocculation stability while simultaneously having a positive influence on the coloristic properties, such as, for example, transparency with mass tone lacquerings and purity of the color shade.

To test for suitability, the compounds of the formula (I) described in the following examples are either applied to pigments or used for dispersing pigments in stoving lacquer systems. Of the large number of known systems, the lacquer systems chosen are an alkyd-melamine resin lacquer (AM) based on a medium-oil, non-drying alkyd resin of synthetic fatty acids and phthalic anhydride and a melamine resin etherified with butanol, and an acrylic resin stoving lacquer based on a non-aqueous dispersion (TSA-NAD). The technological properties, in particular the gloss, are tested on the stoving lacquerings produced with these lacquers. The gloss is measured on cast films at an angle of 20° in accordance with DIN 67530 (ASTM D 523) using the "Multigloss" gloss meter from Byk. In almost all cases, the use of the pigment formulations according to the invention leads to a clear reduction in the viscosity of the pigmented lacquers, in particular of the highly pigmented lacquers.

In the following preparation and use examples, parts relate to parts by weight,. Parts by volume bear the same relationship to parts by weight as the kilogram to the liter.

The viscosity data for the pigmented lacquers in the examples relate to measurements with an RV3 rotary viscometer (Haake) at 20° C. and are quoted in millipascal seconds (mPas). Data on the melting points of the compounds of the formula (I) relate to measurements on a hot bench (Reichert).

PREPARATION EXAMPLES FOR COMPOUNDS OF THE FORMULA (I)

1) 5.5 parts of cyanuric chloride are suspended in 80 parts of xylene at room temperature and a warm solution, at 50° C., of 12.6 parts of 3-amino-N-9-ethylcarbazole in 40 parts of xylene is then slowly added. The reaction mixture is subsequently stirred at 125° C. for 4 hours. After cooling to an internal temperature of about 40° C., 1.7 parts of hexamethylenediamine, dissolved in 10 parts of xylene, are added in the course of 15 minutes. After a further 4 hours of stirring at 110° C., the reaction product is isolated by filtration, washed with xylene and dried. The dried product is stirred in an aqueous alkaline solution at pH 9.5 to 11 at room temperature for one hour, filtered off, washed neutral with water and dried. The product has a melting point of about 216° C.

The product has very good dispersing properties and is outstandingly suitable for the preparation of pigment formulations which are stable to flocculation.

1a) If the procedure is analogous to preparation Example 1 but the hexamethylenediamine is replaced by 3.8 parts of 1-(3-aminopropyl)-imidazole, a product with slightly better dispersing properties is obtained; melting point 310° C.

1b) If the hexamethylenediamine in Preparation Example 1 is replaced by 8.4 parts of oleylamine (composition: 83% $C_{18}$, 12% $C_{16}$, 4% $C_{14}$, 1% $C_{12}$; iodine number 78±5), a product with comparable dispersing properties is obtained; melting point 266° C.

1c) If the hexamethylenediamine in preparation Example 1 is replaced by 1.8 parts of ethianolamine, a product with similarly good dispersing properties is obtained; melting point 227° C.

1d) If the hexamethylenediamine in preparation Example 1 is replaced by 2.2 parts of diethylamine, a product with a comparable dispersing action is obtained; melting point 255° C.

1e) If the procedure is as in Example 1, but 2.7 parts of N,N-dimethylaminoethanol are used instead of the hexamethylenediamine and diethylene glycol dimethyl ether is used as the solvent, a product with comparably good dispersing properties is obtained: melting point 234° C.

1f) If the hexamethylenediamine in preparation Example 1 is replaced by 2.8 parts of aniline and o-dichlorobenzene is used as the solvent, a product with comparable dispersing properties is obtained: melting point 206° C.

1g) If the hexamethylenediamine in Example 1 is replaced by 2.6 parts of morpholine and chlorobenzene is used as the solvent, a product with a slightly poorer dispersing action is obtained; melting point 221° C.

1h) If the procedure is analogous to preparation Example 1a, but the cyanuric chloride is reacted with 6.3 parts of 3-amino-N-9-ethylcarbazole and 7.6 parts of 1-(3-aminopropyl)-imidazole, a product with a comparable dispersing action is obtained; melting point 202° C.

2) 5.5 parts of cyanuric chloride are suspended in 60 parts of dioxane in a stirred vessel with a reflux condenser, internal thermometer and stirrer at room temperature, with stirring. 10.9 parts of 3-aminocarbazole, dissolved in 30 parts of dioxane, are then slowly added and the reaction mixture is heated under reflux for 4 hours. After cooling the reaction mixture to 40° C., 3.9 parts of N,N-diethylaminopropylamine, dissolved in 10 parts of dioxane, are added in the course of 10 minutes and the mixture is heated under reflux for a further 4 hours. After the reaction product has been filtered off, washed and dried, the dried product is stirred in aqueous alkaline solution at a pH of about 10 at room temperature for one hour, isolated, washed neutral and dried. The melting point of the product is about 198° C.

2a) If the N,N-diethylaminopropylamine in preparation Example 2 is replaced by 3.8 parts of 1-(3-aminopropyl)imidazole and xylene is used as the solvent, a product with comparable dispersing properties is obtained; melting point 234° C. 3) 5.5 parts of cyanuric chloride are suspended in 100 parts of xylene in a stirred vessel with a stirrer, reflux condenser and internal thermometer, with stirring. Thereafter, a hot solution, at 60° C., of 14.4 parts of 2-(4-aminophenyl)-6-methylbenzothiazole in 30 parts of xylene are slowly added and the reaction mixture is heated at temperatures between 120° and 130° C. for 5 hours. After cooling to an internal temperature of 40° C., 3 parts of 1,4-bis-(3-aminopropyl)-piperazine, dissolved in 10 parts of xylene, are added in the course of 20 minutes and the mixture is heated at 110° C. for a further 5 hours. The reaction product which has precipitated is filtered off, washed with xylene and dried. The dried product is then stirred in an aqueous-alkaline solution at a pH of 9.5 to 10.5 at room temperature for one hour, isolated, washed neutral and dried; melting point 316° C.

3a) If the 1,4-bis-(3-aminopropyl)-piperazine in Example 3 is replaced by 3.9 parts of 1-(2-aminoethyl)-piperazine, a product with comparable dispersing properties is obtained; melting point 262° C.

3c) If 9.5 parts of 4-(2-diethylamino-ethylsulfonyl)-2,5-dimethoxyaniline are used in Preparation Example 3 instead of the 1,4-bis-(3-aminopropyl)-piperazine, a product with similar dispersing properties is obtained; melting point 184° C.

3d) If the procedure is analogous to preparation Example 3 and 3.9 parts of N,N-diethylaminopropylamine are used instead of the 1,4-bis-(3-aminopropyl)-piperazine, a product with good dispersing properties and a melting point of 159° C. is obtained.

4) 5.5 parts of cyanuric chloride are suspended in 80 parts of xylene, with stirring. 10.8 parts of 2-amino-6- methoxy-benzothiazole, dissolved in 40 parts of xylene, are slowly added to the suspension and the reaction mixture is heated at 120° C. for 4 hours. After cooling to an internal temperature of 40° C., 3.9 parts of N,N-diethylaminopropylamine, dissolved in 10 parts of xylene, are added dropwise in the course of 15 minutes and the mixture is heated at 110° C. for a further 4 hours. Thereafter, the reaction product is isolated from the solution by filtration, washed with xylene and dried. The dried product is stirred in an aqueous-alkaline solution at pH 9.5 to 11 at room temperature for one hour, filtered off, washed neutral and dried; melting point 173° C.

4a) If the procedure is analogous to Example 4, but 9.0 parts of 2-amino-6-methoxy-benzothiazole are used and the N,N-diethylaminopropylamine is replaced by 4.0 parts or 1,4-bis-(3-aminopropyl)-piperazine, a product with a comparable dispersing action is obtained; melting point 238° C.

4b) If the 2-amino-6-methoxy-benzothiazole in Example 4 is replaced by 9.0 parts of 2-aminobenzothiazole, a product with slightly improved dispersing properties is obtained; melting point 226° C.

4c) If the N,N-diethylaminopropylamine in Example 4 is replaced by 3.1 parts of N,N-dimethylaminopropylamine, a product with slightly poorer dispersing properties is obtained; melting point 324° C.

4d) If the 2-amino-6-methoxybenzothiazole in Example 4 is replaced by 16.4 parts of 4-(4-aminophenyl)-benzophenone and chlorobenzene is used as the solvent, a product with similarly good dispersing properties is obtained; melting point 216° C.

4e) If the 2-amino-6-methoxybenzothiazole in Example 4 is replaced by 9.5 parts of 4-aminoquinaldine and in addition the N,N-diethylaminopropylamine is replaced by 3.9 parts of 1-(2-aminoethyl)-piperazine, a product with comparably good dispersing properties is obtained; melting point above 350° C.

5) 5.5 parts of cyanuric chloride and 4.5 parts of 5-aminobenzimidazolone are suspended in 100 parts of xylene and the suspension is heated at 125° C. for 2 hours. After the reaction mixture has been cooled to 60° C., 7.2 parts of 2-(4-aminophenyl)-6-methyl-benzothiazole, dissolved in 30 parts of xylene, are slowly added and the reaction mixture is heated at a 125° C. for 4 hours. 3.8 parts of 1-(3-aminopropyl)-imidazole, dissolved in 10 parts of xylene, are then added at an internal temperature of 40° C. in the course of 10 minutes and the reaction mixture is heated at 110° C. for a further 4 hours. Thereafter, the reaction product is filtered off, washed with xylene and dried. The dried product is stirred in an aqueous-alkaline solution at about pH 9.5 at room temperature for one hour, washed neutral and dried; melting point above 350° C.

6) 9.2 parts of cyanuric chloride are dissolved in 60 parts of methyl ethyl ketone in a stirred vessel and a mixture of 10.1 parts of laurylpropylenediamine, 4.4 parts of 1-(3-amino-propyl)-imidazole and 5.9 parts of 2-(4-aminophenyl)-6-methyl-benzothiazole in 60 parts of methyl ethyl ketone is added dropwise at 1°-3° C. in the course of 30 minutes, and the mixture is subsequently stirred for 30 minutes. Thereafter, 12 parts of 50% strength sodium hydroxide solution are added at 1°-3° C. in the course of 2 minutes. The mixture is first heated at 50° C. for 1 hour and under reflux (77° C.) for 2 hours, the inorganic salt is then filtered off and the filtrate is evaporated to dryness in a Rotavapor. 21.2 parts of a vitreous, brittle product which can be ground are obtained. The product has very good dispersing properties and is outstandingly suitable for preparation of pigment formulations which are stable to flocculation.

7) 11.1 parts of cyanuric chloride are suspended in 70 parts of methyl isobutyl ketone in a stirred vessel and the suspension is cooled to 0° C. 19.0 parts of N,N-bis-(3)-aminopropyl)-tallow fatty amine (composition of the tallow fat radical: 65% $C_{18}$, 30% $C_{16}$, 5% $C_{14}$, iodine number 45±5), 5.0 parts of 1-(3-aminopropyl)imidazole and 6.7 parts of 2-(4-aminophenyl)-6-methylbenzothiazole, dissolved in 40 parts of methyl isobutyl ketone, are added at 1° to 4° C. in the course of 70 minutes, with stirring. 14.4 parts of 50% strength aqueous sodium hydroxide solution are then added rapidly at the same temperature. Thereafter, the reaction mixture is heated at 50° C. for 1 hour and at 90° C. for 2 hours. After addition of 150 parts of methyl isobutyl ketone to the reaction mixture, the salt obtained is filtered off and the solvent is distilled off. A brittle resinous product which has a melting range of 135°-145° C. and very good dispersing properties results.

PREPARATION AND USE OF THE PIGMENT FORMULATIONS

A1) 10 parts of C.I. Pigment Yellow 154 (specific surface area measured by the BET method: 24 m²/g) are dispersed in 100 parts of AM lacquer with the addition of 0.75 part of compound from the particular preparation example shown in the table. The pigmented lacquerings thereby produced are stoved and the gloss is measured. The results are shown in the following table:

| Preparation Example | Gloss |
| --- | --- |
| 3d | 80 |
| 4d | 84 |
| 4a | 75 |
| 5 | 77 |
| Comparison without additive | 47 |

A2) 4 parts of C.I. Pigment Red 122 (specific surface area measured by the BET method: 62 m²/g) are dispersed in 100 parts of AM or TSA-NAD lacquer, with the addition of 0.3 part of the compound from the particular preparation example shown in the table, the lacquerings thereby produced are stoved and the gloss is measured. The results are summarized in the following table:

| Preparation Example | Gloss (AM) | Gloss (TSA-NAD) |
| --- | --- | --- |
| 1a | 81 | 80 |
| 3c | 82 | 80 |
| 3 | 82 | 81 |
| 4b | 83 | 88 |
| 7 | 86 | 91 |
| 3a | 81 | — |
| 2 | 83 | — |
| 3d | 82 | — |
| 4 | 83 | — |
| Comparison without additive | 43 | 53 |

A3) 3 parts of C.I. Pigment Violet 23 (specific surface area measured by the BET method: 86 m²/g) are dispersed in 100 parts of AM or TSA-NAD Lacquer with the addition of 0.3 part of the compound from the particular preparation example shown in the table, the lacquerings thereby produced are stoved and the gloss is measured. The results are summarized in the following table:

| Preparation Example | Gloss (AM) | Gloss (TSA-NAD) |
|---|---|---|
| 1 | 80 | — |
| 1a | 84 | 74 |
| 1b | 80 | — |
| 1c | 85 | 74 |
| 1e | 80 | — |
| 1f | 82 | — |
| 1g | 81 | — |
| 1h | 83 | 73 |
| 3 | 82 | 64 |
| 3a | 82 | — |
| 3c | 85 | — |
| 3d | 83 | 63 |
| 4 | 86 | 77 |
| 4a | 81 | 64 |
| 4b | 86 | 76 |
| 4d | 81 | — |
| Comparison without additive | 16 | 46 |

A4) 30 parts of C.I. Pigment Violet 23, C.I. No. 51319, which still contains 20% of the salt obtained during synthesis, are mixed with 2.4 parts of the compound from Preparation Example 1a and the mixture is ground in a vibratory mill (Vibratom model, Siebtechnik Muhlheim) with 1,575 parts of cylindrical corundum grinding bodies (diameter 12 mm) for 4 hours (speed of rotation 1,400 revolutions/minute, vibration circuit 4 mm). The ground material is then sieved off and the same grinding is repeated a second time. 84 parts of the ground material are now introduced into a stirred vessel containing 126 parts of 85% strength isobutanol and 16.8 parts of 98 to 100% strength formic acid. After stirring at 20° to 25° C. for 20 hours, 504 parts of water are added and the isobutanol is then distilled off azeotropically to a passing over temperature of 100° C. The distillation residue is filtered and the filter cake is washed neutral. 133.7 parts of pigment press-cake are obtained and are stirred with 454.3 parts of water and 210 parts of 85% strength isobutanol in an autoclave. The suspension is heated at 125° C. for 3 hours. It is then allowed to cool to 90° C. and the isobutanol is distilled off azeotropically to a passing over temperature of 100° C. The distillation residue is filtered and the filter cake is washed with water and dried at 80° C. 63.8 parts of pigment which is outstandingly suitable for coloring lacquers, plastic compositions and printing inks, the pigmented lacquers being distinguished in particular by a low viscosity, even at high pigment concentrations, and by an outstanding flocculation stability, result. The gloss value in an AM lacquer is 83, whereas the comparison without the finish gives only 52.

A5) If the procedure is as in Example A4, but 4 parts of a commercially available dispersing agent based on an alkylphenol polyglycol ethersulfate are also used during finishing of the pigment, 63.1 parts of a pigment formulation which is distinguished by a good flocculation stability and a low viscosity in pigmented lacquers are obtained. The gloss value in a TSA-NAD lacquer is 75, whilst the comparison without the finish has a gloss value of 58.

A6) The vibration grinding is initially repeated analogously to Example A4, but without the addition of the compound from preparation Example 1a. 84 parts of ground material result. 75 parts of isobutanol (85% strength), 10 parts of formic acid (98 to 100% strength), 2 parts of a commercially available dispersing agent based on alkylphenol polyglycol ethersulfate and 4 parts of the compound from Preparation Example 1a are introduced into a stirred vessel. 50 parts of ground material re introduced, with stirring, and the mixture is subsequently stirred at 20° to 25° C. for 20 hours. 300 parts of water are then added and the suspension is heated at the boiling point for 5 hours. The isobutanol is then distilled off azeotropically to a passing over temperature of 100° C. The distillation residue is filtered and the filter cake is washed neutral and dried. 43.3 parts of a pigment formulation which gives a gloss value of 88 in AM lacquer, whilst the comparison without the finish has a gloss value of only 18, are isolated.

A7) 9 parts of C.I. Pigment Violet 23, C.I. No. 51319, and 1 part of the compound from Preparation Example 1a are mixed in a laboratory mill. A cast film of the sample (TSA-NAD lacquer) gives a gloss value of 70, whilst the comparison sample without the finish gives a value of 34.

A8) 9 parts of C.I. Pigment Violet 23 and 1 part of the compound from Preparation Example 1 are mixed on a laboratory mill. A film cast from the sample (TSA-NAD lacquer) gives a gloss value of 63, whilst a comparison sample without the finish gives a value of 34.

A9) If the procedure is as in A5, but the compound from preparation Example 1a used there is replaced by 2.4 parts of the compound from Preparation Example 3d, 64.1 parts of a pigment formulation which gives a gloss value of 76 in a TSA-NAD lacquer, whilst the comparison without the finish has a gloss value of only 37, are obtained.

A10) If the procedure is as in A5, but the compound from preparation Example 1a is replaced by 2.4 parts of the compound from preparation Example 4b, 62.9 parts of a pigment formulation which has a gloss value of 82 in an AM lacquer, whilst the comparison without the finish gives a gloss value of only 16, are obtained.

A11) If the procedure is as in A5, but the compound from Example 1a is replaced by 2.4 parts of the compound from Example 4, 64.2 parts of a pigment formulation which gives a gloss of 87 in an AM lacquer, whilst the comparison without the finish gives a gloss of 16, are isolated.

A12) If the procedure is as in Example A5, but the compound from Example 1a is replaced by 2.4 parts of the compound from Example 3a, 63.7 parts of a pigment formulation are obtained. Gloss value (AM lacquer): 85; gloss value for the comparison without the finish: 16.

A13) 9 parts of C.I. Pigment Violet 23 and 1 part of the compound from Example 3 are mixed on a laboratory mill. A film cast from the sample (AM lacquer) gives a gloss value of 83, and the comparison without the finish gives a value of only 10.

A14) 9 parts of C.I. Pigment Violet 23 and 1 part of the compound from Example 2 are mixed on a laboratory mill. A film cast from the sample (AM lacquer) gives a gloss value of 85; the comparison without the finish has a value of only 10.

A15) 19 parts of C.I. Pigment Red 159, C.I. No. 71130, and one part of the compound from Example 4b are mixed on a laboratory mill. A 15% strength pigment concentrate prepared from the resulting pigment formulation with a TSA-NAD lacquer as the medium is distinguished by a particularly low viscosity, whilst the comparison sample without the finish has a very high viscosity. The viscosities of the pigment concentrate at various frequencies of rotation of the rotary viscometer are compared with the values of the comparison without the finish in the table:

| Frequency of rotation [min$^{-1}$] | Viscosity (sample) | Viscosity (comparison without the finish) |
|---|---|---|
| 31.25 | 112.6 | 185 |
| 62.5 | 92.5 | 172.9 |
| 125 | 82.4 | 166.7 |
| 250 | 77.4 | 161.9 |

A16) 50 parts of perylene-3,4,9,10-tetracarboxylic acid dianhydride in the form of a moist press-cake and 7.5 parts of the compound from Example 4 in the form of a moist press-cake are introduced into 1,000 parts of water. After the suspension has been cooled to 0° C. 74 parts of a 45.5% strength aqueous monomethylamine solution are added dropwise in the course of 10 minutes. The mixture is subsequently stirred at 0° to 5° C. for a further 15 minutes, and a solution of 28.3 parts of anhydrous calcium chloride in 83.3 parts of water is then added at about 0° C. in the course of 15 minutes. After the suspension has been subsequently stirred at 0° C. for one hour, it is heated to 80° C. and kept at this temperature for 2 hours. Thereafter, the pigment formulation is isolated, washed neutral and dried. 56.2 parts of a formulation of C.I. Pigment Red 179 are obtained. A 15% strength pigment concentrate prepared from the pigment formulation in a TSA-NAD lacquer is distinguished by a very low viscosity, whilst the comparison sample without the finish has a very high viscosity. The viscosities of the pigment concentrate at various frequencies of rotation of the rotary viscometer are compared with the values of the comparison without the finish in the following table:

| Frequency of rotation [min$^{-1}$] | Viscosity (sample) | Viscosity (comparison without the finish) |
|---|---|---|
| 31.25 | 132.3 | 192.8 |
| 62.5 | 109.7 | 181.5 |
| 125 | 98.2 | 176.0 |
| 250 | 92.3 | 172.2 |

A17) 30 parts of Indanthren-Bordo RR (C.I. Vat Red, 15, α-modification) of 99% purity are introduced into 470 parts of chlorobenzene. After addition of one part of 33% strength sodium hydroxide solution, the mixture is stirred at 20° to 30° C. for one hour. Thereafter, it is heated to the boiling point and kept under reflux for 3 hours. It is subsequently cooled to 80° C. 1.5 parts of the compound from Example 1a are added and the mixture is subsequently stirred at 70° to 80° C. for one hour. After addition of water, the chlorobenzene is distilled off azeotropically, the aqueous suspension freed from the chlorobenzene is filtered and the residue on the filter is washed with hot water. The pigment formulation is dried at 60° to 70° C. and ground. 31.5 parts of a formulation of the pigment in the β-modification are obtained. An AM lacquer pigmented with this formulation has a good gloss value of 87, whilst the comparison without the finish has a value of only 25.

A18) If the procedure is as in A17, but 0.9 part of the compound from Example 1a is used instead of 1.5 parts, the film cast from the sample (AM lacquer) gives a gloss value of 82.

A19) If the 1.5 parts of the compound from Preparation Example 1a in A17 are replaced by 1.5 parts of the compound from preparation Example 3d, the film cast from the sample (AM lacquer) has a gloss value of 85.

A20) 131 parts of 26% pure aqueous-moist neutral crude 2,9-dimethylquinacridone (C.I. Pigment ed 122. C.I. No. 73915), which is obtainable by cyclization of 2,5-di-(p-methylphenylamino)-terephthalic acid in polyphosphoric acid at 125° C. and subsequent hydrolysis with water at 20° C., are suspended in 200 parts of isobutanol, 37 parts f water and 5 parts of 33% strength sodium hydroxide solution and the suspension is stirred at 130° C. in a closed vessel for 3 hours. It is then allowed to cool to 55° C., a solution of 3.7 parts of the compound from Example 4b, dissolved in 30 parts of N-methyl-2-pyrrolidone, is added dropwise and the mixture is stirred for a further 2 hours. The isobutanol is then distilled off with steam and the coated pigment is isolated by filtration and dried at 80° C. 37.5 parts of a magenta pigment with outstanding rheological and coloristic properties are obtained. An AM lacquer pigmented with this has a very good gloss value of 94, as compared with a gloss value of 23 for the comparison without the finish.

A21) 130 parts of 25.4% pure aqueous-moist neutral crude 2,9-dimethylquinacridone (C.I. Pigment Red 122), prepared as described in A20, are suspended in 200 parts of isobutanol and 45 parts of water, the suspension is heated at 50° C., 2.5 parts of the compound from Example 2a, dissolved in 15 parts of N-methyl-2-pyrrolidone, are added in the course of 20 minutes and the mixture is heated under reflux for 2 hours. It is then brought to pH 8.5 with dilute sodium hydroxide solution and the suspension is heated in a closed vessel at 125° C. for 3 hours. After the isobutanol has been distilled off with steam, the coated pigment is isolated by filtration and dried at 80° C. 33.6 parts of a magenta pigment with outstanding technological properties are obtained. An AM lacquer pigmented with this pigment has a gloss value of 88. In contrast to this, the comparison without the finish has a gloss value of only 25.

A22) 10 parts of a mixture consisting of 116 parts of 85% strength phosphoric acid, 182 parts of 33% strength sodium hydroxide solution and 702 parts of water are added to 100 parts of a 5% strength suspension of C.I. Pigment Yellow 154. The mixture is then heated to 60° C. and a solution of 1 part of the compound from Example 6) and 8 parts of acetic acid is added dropwise in the course of about 10 minutes. The mixture is subsequently stirred at 60° C. for 30 minutes and without heating for 30 minutes and cooled to 20° C. by adding ice, and the product is filtered off with suction, washed in portions with a total of 500 parts of water and dried at 65° C. in a circulating air cabinet. 21 parts of a pigment formulation which is outstandingly suitable for dyeing lacquers, plastic compositions and printing inks, the pigmented lacquers being distinguished in particular by a low viscosity, even at high pigment concentrations, and by an outstanding flocculation stability, result. The gloss value in AM lacquer is 85, whilst the comparison without the finish gives a gloss value of only 31.

We claim:
1. A pigment formulation consisting essentially of:
   a) 99.8% to 50% by weight of one or more pigments selected from the group consisting of organic or inorganic azo pigments, azaporphines, quinacridones, diketopyrrolopyrroles, flavanthrone, anthanthrone and pyranthrone substances, derivatives of naphthalenetetracarboxylic acid, perylene- tetracarboxylic acid, thioindigo, dioxazine or tetrachloroisoindolinone, magnesium lake pigments, calcium lake pigments, barium lake pigments, aluminum lake pigments, manganese and nickel lakes of dyestuffs containing acid groups, and corresponding mixtures thereof and b) 0.2% to 30% by weight of one or more colorless or only slightly colored compounds of the formula (I)

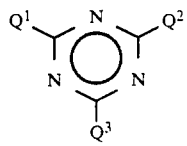

(I)

in which
$Q^1$, $Q^2$ and $Q^3$ independently of one another each denote a —X—A, —OR$^1$, —SR$^1$, halogen or —NR$^2$R$^3$ radical or a radical Q of one, two or up to fifteen trivalent groups of the formula (Ia)

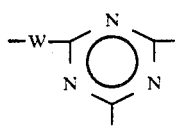

(Ia)

each of which is bonded via the divalent group W to a free valency of the next group of the formula (Ia) or to the triazine ring of the parent substance of the formula (I) and on the other free valencies in each case to a —X—A, —OR$^1$, —SR$^1$, halogen or —NR$^2$R$^3$ radical and which, in the case of more than two groups of the formula (Ia), are bonded to one another in linear or branched form, at least one radical of the formula —X—A being present in the compound of formula (I) and A stands for the radical of an aromatic ring system with 2 to 6 fused-on rings and with a total of at least 9 ring atoms, or stands for the radical of a group of 2 to 3 bonded aromatic ring systems in each case of one ring or 2 to 4 fused-on rings with in each case 5 to 7 ring atoms per ring, in which the bonded aromatic ring systems are bonded via a direct bond or a divalent group from the series consisting of —O—, —S—, —CO—, —SO—, —SO$_2$— and C$_1$-C$_{12}$-alkylene, or stands for one of the radicals mentioned, which contain one or more substituents selected from the series consisting of C$_1$-C$_{24}$-alkyl, —OR', halogen, —NR'R", —COOR', —CONR'R", —NR'COR", —CN, —CF$_3$ and —NO$_2$, in which R' and R" independently of one another denote hydrogen or a straight-chain or branched C$_1$-C$_{12}$-alkyl, or together with the N atom denote a 5- or 6-membered heterocyclic radical, X stands for a divalent group —NR*—, —O— or —S— in which R* denotes a radical from the series consisting of hydrogen, C$_1$-C$_6$-alkyl, C$_1$-C$_6$-hydroxyalkyl, (C$_1$-C$_4$-alkoxy) -C$_1$-C$_6$-alkyl and C$_5$-C$_7$-cycloalkyl, R$^1$, R$^2$ and R$^3$ independently of one another stand for the hydrogen radical, straight-chain or branched C$_1$-C$_{24}$-alkyl or C$_2$-C$_{24}$-alkenyl, C$_5$-C$_{12}$-cycloalkyl with one or two rings, C$_7$-C$_{18}$-aralkyl, heteroaryl with 1 or 2 rings and a total of 5 to 8 ring atoms, phenyl, a phenyl radical which is substituted by at least one radical form the group consisting of C$_1$-C$_{12}$-alkyl, halogen, —OR$^4$, —NR$^4$R$^5$, —COOR$^4$, —CONR$^4$R$^5$, —NR$^5$COR$^4$, —CN, —CF$_3$, —NO$_2$ and —T—(CH$_2$)$_p$—NR$^o$R$^t$, in which R$^4$ and R$^5$ independently of one another denote hydrogen or C$_1$-C$_{24}$-alkyl, R$^o$ and R$^t$ independently of one another denote C$_1$-C$_{24}$-alkyl, p denotes a number from 1 to 6 and T denotes a direct bond or a divalent group from the series consisting of —O—, —S—, —CO—, —SO—, —SO$_2$—, —NR$^a$— —NR$^a$CO—, —NR$^a$SO$_2$—, —SO$_2$NR$^a$ and —CONR$^a$ and R$^a$ denotes hydrogen or C$_1$-C$_{12}$-alkyl group, or stands for C$_1$-C$_{12}$-hydroxyalkyl or polyhydroxyalkyl or stands for a C$_1$-C$_{30}$-alkyl radical, which is interrupted in the chain by one or more non-adjacent divalent groups of the formula —O— or —NR$^v$—, in which R$^v$ denotes hydrogen or C$_1$-C$_{24}$-alkyl, or a combination of at least two of the divalent groups and which can be substituted by a 5- or 6-membered heterocyclic ring, or R$^1$ has the above mentioned meaning and R$^2$ and R$^3$, together with the n atom, stand for a 5- or 6-membered ring of a heterocyclic system with one or two rings, and W represents a divalent group of the formula —NR$^s$—Y—NR$^t$—, —O—Y—O—, —O—Y—NE$^8$—, —S—Y—S—, —O—Y—S— or —NR$^s$—Y—S—, wherein, in the above formulae, Y stands for a straight-chain or branched C$_2$-C$_{20}$-alkylene group of a C$_2$-C$_{20}$-alkylene group, which is interrupted by one or more groups —O—, —S—, —NR$^u$, in which R$^u$ denotes hydrogen or C$_1$-C$_{24}$-alkyl, —CO—, —SO—, —SO$_2$—, C$_5$-C$_7$-cycloalkylene or C$_5$-C$_{10}$-arylene, a divalent heterocyclic ring with 5 to 7 ring atoms or a combination of the above groups, which is optionally further substituted, or stands for a divalent 1-, 2- or 3-nuclear saturated, unsaturated or aromatic carbocyclic or heterocyclic ring system with 5 to 14 ring atoms, or two of the ring systems which are linked via a direct bond or a C$_1$-C$_6$-alkylene, —O—, —S—, —CO—, —SO— or —SO$_2$— group, the ring systems being optionally further substituted, and R$^s$ and R$^t$ independently of one another denote a hydrogen radical, C$_1$-C$_{24}$-alkyl, C$_1$-C$_6$-hydroxyalkyl, (C$_1$-C$_4$-alkoxy)-C$_1$-C$_6$-alkyl or C$_5$-C$_7$-cycloalkyl or, together with N—Y—N, denote a heterocyclic ring, c) 0 to 20% by weight of an anionic, cationic or nonionic surfactant, selected from the group consisting of alkyl sulfates, alkyl sulfonates, alkyl phosphates, alkyl benzenesulfonates, lauryl sulfate, stearyl sulfate, dodecyl sulfate, dodecyl sulfonates, octadecyl phosphates, dodecylbenzenesulfontes, sulfosuccinic acid esters, condensation products of a fatty acid and taurine or hydroxyethanesulfonic acid, resin soaps, alkoxylation products of alkylphenols, fatty alcohols, fatty amines, fatty acids, fatty acid amides, reaction products of nonylphenol, dodecylphenol, lauryl alcohol, coconut fatty alcohol, stearyl alcohol, oleyl alcohol, coconut fatty amine, tallow fatty amine, stearylamine, oleylamine, coconut fatty acid, stearic acid or oleic acid with 2 to 100 mol of ethylene oxide, reaction products of oxyethylated alkylphenols and fatty alcohols with chlorosulfonic acid and phosphorus oxychlorides, quaternary ammonium salts, hexadecyltrimethylammonium chloride, or mixtures thereof and
d) 0 to 20% by weight of customary additives, the amounts of constituents b), c) and d) being based on the weight of the pigment or pigments.

2. A pigment formulation as claimed in claim 1, comprising a compound of the formula (I) in which $Q^1$, $Q^2$ and $Q^3$ independently of one another each denote a radical of the formula $-X-A$ or $-NR^2R^3$ or a radical Q of 1 to 15 trivalent groups of the formula (Ia), each of which are bonded via a divalent group W to a free valency of the next group o the formula (Ia) or to the triazine radical of the parent substance of the formula (I) and on the other free valencies in each case to a radical $-X-A$ or $-NR^2R^3$ and which, in the case of more than two groups of the formula (Ia), are bonded to one another in linear or branched form, at least one radical of the formula $-X-A$ being present in the compound of the formula (I).

3. A pigment formulation as claimed in claim 1, comprising a compound of the formula (I) in which A stands for the radical of an aromatic ring system with 2 or 3 fused-on rings with 9 to 14 ring atoms, or stands for the radical of a group of 2 aromatic ring systems with in each case one ring or two fused-on rings with in each case 5 to 7 ring atoms per ring, in which the bonded aromatic systems are bonded via a direct bond or a divalent group from the series comprising $-O-$, $-CO-$, $-SO_2-$ and $-CH_2-$, or stands for one of the radicals mentioned which contains one to three radicals from the series comprising $C_1-C_{23}$-alkyl, $-OR'$, halogen, $-NR'R''$, $-COOR'$, $-CONR'R''$, $-NR'COR''$, $-CN$, $CF_3$ or $-NO_2$, in which $R'$ and $R''$ independently of one another denote hydrogen or $C_1-C_4$-alkyl or, together with the N atom, denote a heterocyclic radical, and X stands for a divalent group $-NR^*-$, $-O-$ or S, in which $R^*$ denotes hydrogen or $C_1-C_4$-alkyl.

4. A pigment formulation as claimed in claim 1, comprising a compound of the formula (I) in which A represents the radical of a heteroaromatic ring system with 2 or 3 fused-on rings with a total of 9 to 14 ring atoms and nitrogen or sulfur atoms or a mixture thereof as heteroatoms, the ring system not being further substituted or containing at least one of the substituents mentioned.

5. A pigment formulation as claimed in claim 1, comprising a compound of the formula (I) in which $R^1$, $R^2$ and $R^3$ independently of one another stand for the hydrogen radical, straight-chain or branched $C_1-C_{12}$-alkyl or $C_3-C_{12}$alk-(2-1)-enyl, $C_5-C_7$-cycloalkyl, $C_7-C_{12}$-phenylalkyl, heteroaryl with 5 or 6 ring atoms, phenyl, a phenyl radical which is substituted by 1 to 3 radicals from the group consisting of $C_1-C_{12}$-alkyl, Cl, $-OR^4$, $-NR^4R^5$ and $-T-(CH_2)_p-NR^oR^t$ in which $R^4$ and $R^5$ independently of one another denote hydrogen or $C_1-C_4$-alkyl, $R^o$ and $R^t$ independently of one another denote $C_1-C_{12}$-alkyl, p denotes a number from 1 to 6 and T denotes a direct bond or a divalent group from the series comprising $-SO_2-$, $-SO_2NR^a-$ and $-CONR^a-$, or stand for $C_1-C_6$-hydroxyalkyl or $(C_1-C_4$-alkoxy)-$C_1-C_{12}$-alkyl, or stand for a radical of the formula $-(CR^6R^7)_q-NR^8R^9$, in which q denotes a number from 1 to 6, $R^6$ and $R^7$ independently of one another denote hydrogen or $C_1-C_6$-alkyl, and $R^8$ and $R^9$ independently of one another denote $C_1-C_{24}$-alkyl or $R^8$ denotes hydrogen and $R^9$ denotes $C_1-C_{24}$-alkyl, or $R^8$ and $R^9$, together with the N atom, denote a 5- or 6-membered ring of a heterocyclic system, or $R^1$ has the abovementioned meaning and $R^2$ and $R^3$, together with the N atom, stand for an optionally saturated, aromatic heterocyclic ring which has 5 or 6 ring atoms and which is optionally further substituted.

6. A pigment formulation as claimed in claim 1, comprising a compound of the formula (I) in which W represents a group of the formula $-NR^s-Y-NR^t-$, in which Y stands for a straight-chain $C_2-C_8$-alkylene group or a $C_2-C_{12}$-alkylene group which is interrupted by one or more divalent $-O-$, $-S-$, $-NR^u-$, in which $R^u$ denotes hydrogen or $C_1-C_{18}$-alkyl, $-CO-$, $-SO-$, or $-SO_2-$ groups or a divalent heterocyclic radical with 5 to 7 ring atoms or a combination of the above groups, or stands for a divalent mono- or dinuclear carbocyclic or heterocyclic ring system with 5 to 8 ring atoms, or stands for two of the ring systems, which are linked via a direct bond or a $-CH_2-$, $-CH(CH_3)-$, $-C(CH_3)_2-$, $-O-$, $-S-$, $-CO-$, $-SO-$ or $-SO_2-$ group, the ring systems are optionally further substituted, and $R^s$ and $R^t$ denote hydrogen or $C_1-C_{18}$-alkyl.

7. A pigment formulation as claimed in claim 1, comprising 0.7 to 10 mg of a compound of the formula (I) per square meter of pigment surface.

8. A pigment formulation as claimed in claim 5, wherein T denotes $(C_1-C_4$-alkoxy)-$C_1-C_6$-alkyl, q is a number from 1 to 3 and $R^6$ and $R^7$ are hydrogen.

9. The pigment formulation of claim 1 wherein said organic or inorganic pigment is present in an amount ranging from 97% to 70% by weight.

10. The pigment formulation of claim 1, wherein said compound of the formula (I) is present in an amount ranging from 1% to 20% by weight of pigment.

11. The pigment formulation as claimed in claim 7, wherein said compound of the formula (I) is present in an amount ranging rom 0.6 to 5 mg per square meter of pigment surface.

12. A pigment formulation as claimed in claim 1 consisting essentially of:
a) 97% to 70% by weight of at least one organic pigment,
b) 3% to 15% by weight, of a compound of the formula (I),
c) 0 to 10% by weight, of an anionic, cationic, or nonionic surfactant, and
d) 0 to 10% by weight, of customary additives, the amounts of the constituents b), c) and d) being based on the weight of the pigment or pigments.

* * * * *

UNITED STATES PATENT AND TRADEMARK OFFICE
CERTIFICATE OF CORRECTION

PATENT NO. : 5,112,404
DATED : May 12, 1992
INVENTOR(S) : Andreas Sommer, et. al.

It is certified that error appears in the above-indentified patent and that said Letters Patent is hereby corrected as shown below:

At column 3, line 6, "$R^4$" should read --$R^5$--.

At column 3, line 32, "n atoms" should read --N atom--.

At column 3, line 36, "n atom" should read --N atom--.

At column 3, line 40, "-O-OY-S-" should read -- -O-Y-S- --.

At column 3, line 63:

"$(C_1-C_4$-alkoxy$)-C_1 14C_6$-alkyl" should read --$(C_1-C_4$-alkoxy$)-C_1C_6$-alkyl--.

At column 4, line 17, "-S-A" should read -- -X-A--.

At column 4, line 65, "n atom" should read --N atom--.

At column 8, line 14, "disphenol" should read --bisphenol--.

UNITED STATES PATENT AND TRADEMARK OFFICE
CERTIFICATE OF CORRECTION

PATENT NO. : 5,112,404

DATED : May 12, 1992

INVENTOR(S) : Andreas Sommer, et al.

It is certified that error appears in the above-indentified patent and that said Letters Patent is hereby corrected as shown below:

At column 12, line 56, after "266°C", please insert: --3b) If the procedure is analogous to Example 3, but 3.0 parts of 4,4'-diaminodiphenylmethane are used instead of the 1,4-bis-(3-aminopropyl)-piperazine, a product with a comparable dispersing action is obtained; melting point 262°C.--.

At column 13, line 44, "a125°C" should read --125°C--.

At column 18, line 4, "ed" should read --Red--.

At column 18, line 9, "f" should read --of--.

IN THE CLAIMS

In claim 1, at column 20, line 2, "form" should read --from--.

In claim 1, at column 20, line 16, please insert a -- - -- before "polyhydroxyalkyl".

In claim 1, at column 20, line 26, "n atom" should read --N atom--.

In claim 1, at column 20, line 31, "-O-Y-NE$^8$" should read -- -O-Y-NR$^5$--.

UNITED STATES PATENT AND TRADEMARK OFFICE
CERTIFICATE OF CORRECTION

PATENT NO. : 5,112,404
DATED : May 12, 1992
INVENTOR(S) : Andreas Sommer, et al.

It is certified that error appears in the above-indentified patent and that said Letters Patent is hereby corrected as shown below:

In claim 1, at column 20, line 34, "of" should read --or--.

In claim 2, at column 21, line 15, "o" should read --of--.

In claim 3, at column 21, line 34, "$C_1$-$C_{23}$-alkyl" should read --$C_1$-$C_{24}$-alkyl--.

In claim 5, at column 21, line 53, "$C_3$-$C_{12}$-alk-(2-1)-enyl" should read $C_3$-$C_{12}$-alk-(2-11)-enyl--.

In claim 7, at column 22, line 34, "0.7" should read --0.3--.

Signed and Sealed this

Ninth Day of November, 1993

BRUCE LEHMAN

*Attest:*

*Attesting Officer*   *Commissioner of Patents and Trademarks*